US009217250B2

(12) United States Patent
Perra et al.

(10) Patent No.: US 9,217,250 B2
(45) Date of Patent: *Dec. 22, 2015

(54) FLOOR PANEL AND FLOOR COVERING CONSISTING OF A PLURALITY OF SUCH FLOOR PANELS

(71) Applicant: Innovations 4 Flooring Holding N. V., Willemstad (CW)

(72) Inventors: Antonio Giuseppe Perra, Bergen (NL); Sander Gordon Zweed, Bussum (NL)

(73) Assignee: Innovations 4 Flooring Holding N. V., Willemstad (CW)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,543

(22) Filed: Feb. 9, 2015

(65) Prior Publication Data

US 2015/0152647 A1  Jun. 4, 2015

Related U.S. Application Data

(63) Continuation of application No. 14/251,766, filed on Apr. 14, 2014, now Pat. No. 8,978,336, which is a continuation of application No. 13/316,871, filed on Dec. 12, 2011, now Pat. No. 8,745,952, which is a continuation of application No. PCT/NL2010/050365, filed on Jun. 14, 2010.

(30) Foreign Application Priority Data

Jun. 12, 2009 (NL) .................................... 2003019
Sep. 9, 2009 (WO) ................ PCT/NL2009/050540

(51) Int. Cl.
*E04F 15/02* (2006.01)
*F16B 5/00* (2006.01)

(52) U.S. Cl.
CPC ........... *E04F 15/02038* (2013.01); *E04F 15/02* (2013.01); *E04F 2201/0123* (2013.01); *E04F 2201/0138* (2013.01); *E04F 2201/0146* (2013.01); *E04F 2201/03* (2013.01); *F16B 5/0056* (2013.01)

(58) Field of Classification Search
CPC ......... E04F 15/10; E04F 15/107; E04F 15/02; E04F 15/02005; E04F 15/02038; E04F 2201/03; E04F 2201/04; E04F 2201/041; E04F 2201/042; E04F 2201/043; E04F 2201/044; E04F 2201/045; E04F 2201/046
USPC ............. 52/578, 586.1, 592.1, 390, 392, 533, 52/534, 553, 582.1, 586.2, 589.1, 590.2, 52/590.3, 591.1–591.5, 592.2, 592.4, 52/745.06, 745.19, 747.1, 747.11, 748.1, 52/748.11, 539; 403/334, 345, 364–368, 403/372, 375, 376, 381; 404/34, 35, 40, 41, 404/46, 47, 49–58, 68, 70; 428/44, 47–50, 428/57, 58, 60, 61, 106, 192–194
See application file for complete search history.

(56) References Cited

U.S. PATENT DOCUMENTS 3,921,312 A   11/1975   Fuller
4,426,820 A   1/1984    Terbrack et al.
(Continued)

FOREIGN PATENT DOCUMENTS

DE        19933343 A1     2/2001
DE     202005004537 U1    6/2005
(Continued)

*Primary Examiner* — William Gilbert
(74) *Attorney, Agent, or Firm* — The Webb Law Firm

(57) ABSTRACT

The invention relates to a floor panel, in particular a laminated floor panel. The invention also relates to a floor covering consisting of a plurality of mutually coupled floor panels according to the invention. The invention further relates to a method for mutually coupling two floor panels, in particular laminated floor panels, according to the invention.

26 Claims, 14 Drawing Sheets

(56) References Cited

U.S. PATENT DOCUMENTS

| | | |
|---|---|---|
| 6,006,486 A | 12/1999 | Moriau et al. |
| 6,490,836 B1 | 12/2002 | Moriau et al. |
| 6,505,452 B1 | 1/2003 | Hannig et al. |
| 6,591,568 B1 | 7/2003 | Palsson |
| 6,769,219 B2 | 8/2004 | Schwitte et al. |
| 6,874,292 B2 | 4/2005 | Moriau et al. |
| 6,880,307 B2 | 4/2005 | Schwitte et al. |
| 6,928,779 B2 | 8/2005 | Moriau et al. |
| 6,955,020 B2 | 10/2005 | Moriau et al. |
| 7,121,058 B2 | 10/2006 | Palsson et al. |
| 7,617,651 B2 | 11/2009 | Grafenauer |
| 7,654,054 B2 | 2/2010 | Moriau et al. |
| 7,712,280 B2 | 5/2010 | Moriau et al. |
| 7,757,453 B2 | 7/2010 | Moriau et al. |
| 7,810,297 B2 | 10/2010 | Moriau et al. |
| 7,874,119 B2 | 1/2011 | Pervan et al. |
| 7,980,043 B2 | 7/2011 | Moebus |
| 8,091,238 B2 | 1/2012 | Hannig |
| 8,281,549 B2 | 10/2012 | Du |
| 8,689,512 B2 | 4/2014 | Pervan |
| 2003/0093964 A1 | 5/2003 | Bushey et al. |
| 2005/0028474 A1 | 2/2005 | Kim |
| 2005/0183370 A1 | 8/2005 | Cripps |
| 2008/0034701 A1 | 2/2008 | Pervan |
| 2009/0126308 A1 | 5/2009 | Hannig et al. |

FOREIGN PATENT DOCUMENTS

| | | |
|---|---|---|
| DE | 102006011887 A1 | 7/2007 |
| EP | 1243721 A2 | 9/2002 |
| FR | 2826391 A1 | 12/2002 |
| WO | 0188306 A1 | 11/2001 |
| WO | 2007118352 A1 | 10/2007 |

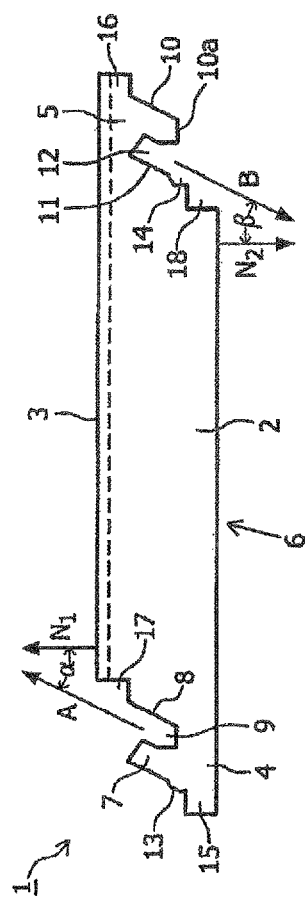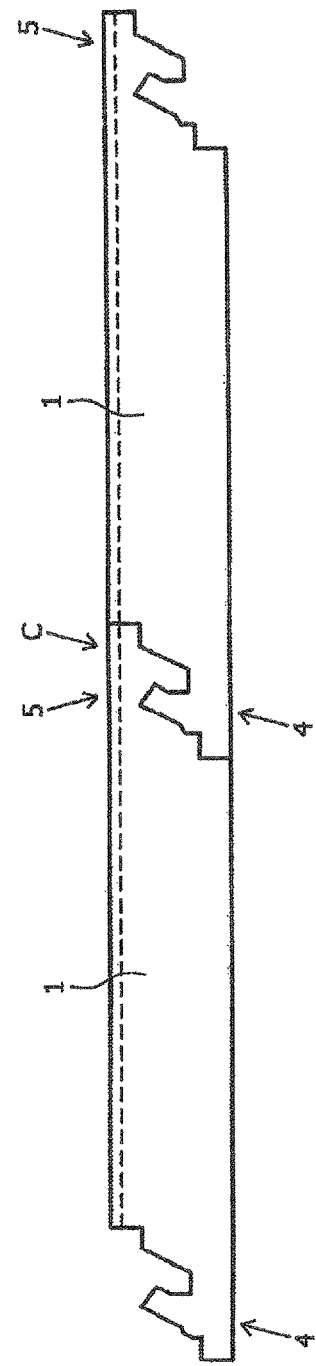

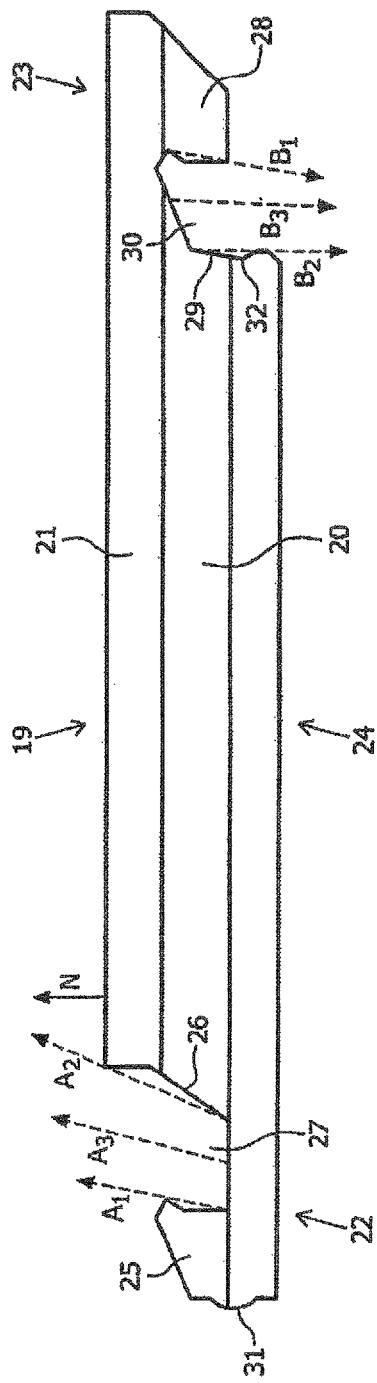
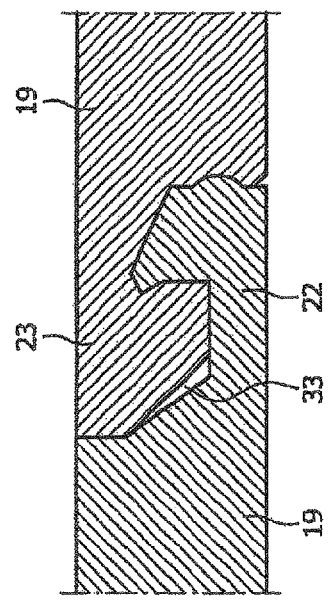

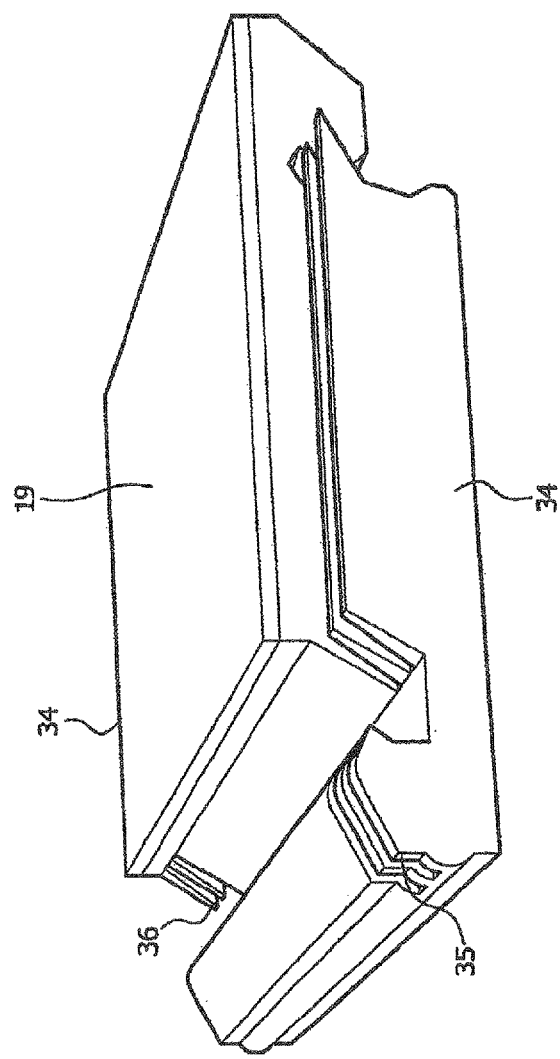

FLOOR PANEL AND FLOOR COVERING CONSISTING OF A PLURALITY OF SUCH FLOOR PANELS

CROSS REFERENCE TO RELATED APPLICATIONS

This application is a continuation of U.S. application Ser. No. 14/251,766, filed on Apr. 14, 2014, which is a continuation of U.S. application Ser. No. 13/316,871, now U.S. Pat. No. 8,745,952, filed Dec. 12, 2011, which is a continuation of International Application No. PCT/NL2010/050365, filed Jun. 14, 2010, which claims benefit of priority of The Netherlands Patent Application No. 2003019, filed Jun. 12, 2009 and PCT/NL2009/050540, filed Sep. 9, 2009, the disclosures of which are incorporated herein by reference in their entirety.

BACKGROUND OF THE INVENTION

1. Field of the Invention

The invention relates to a floor panel, in particular a laminated floor panel. The invention also relates to a floor covering consisting of a plurality of mutually coupled floor panels according to the invention. The invention further relates to a method for mutually coupling two floor panels, in particular laminated floor panels, according to the invention.

2. Description of Related Art

The last ten years has seen enormous advance in the market for laminate for hard floor covering. An important aspect during the product development of the laminate is the facility with which a laminated floor can be laid. The American U.S. Pat. No. 6,490,836 describes a laminate consisting of floor panels which can be mutually coupled, wherein the coupling of two floor panels can be realized by having the floor panels engage each other at an angle, followed by tilting the floor panels relative to each other, whereby the floor panels can in fact be hooked into each other. Although the known laminate can be laid relatively easily by a user, the known floor covering also has a number of drawbacks. A significant drawback of the known floor covering is that, due to the tilting movement required to realize the coupling, relatively great forces are exerted on the floor parts, which can result in permanent damage (breakage). Another drawback of the known laminate is that a relatively large amount of space is required to enable mutual coupling of the floor panels, which makes coupling of a floor panel to an adjacent floor panel considerably more difficult, or even impossible, in a limited space, such as for instance close to a wall or under a radiator.

SUMMARY OF THE INVENTION

The invention has for its object to provide an improved floor panel which can be coupled in improved manner to an adjacent floor panel.

The invention provides for this purpose a floor panel, comprising: a centrally located core provided with an upper side and a lower side, at least one first resilient coupling part and second resilient coupling part connected respectively to opposite edges of the core, which first coupling part comprises a single tongue, at least one upward flank lying at a distance from the upward tongue and a single upward groove formed between the upward tongue and the upward flank, wherein: at least a part of a side of the upward tongue facing toward the upward flank extends in the direction of the normal of the upper side of the core, at least a part of a side of the upward tongue facing toward the upward flank forms an aligning edge for the purpose of coupling the first coupling part to a second coupling part of an adjacent floor panel, at least a part of a side of the upward tongue facing away from the upward flank is provided with a first locking element which is connected substantially rigidly to the upward tongue and adapted for co-action with a second locking element of a second coupling part of an adjacent floor panel, which second coupling part comprises a single downward tongue, at least one downward flank lying at a distance from the downward tongue, and a single downward groove formed between the downward tongue and the downward flank, wherein: at least a part of a side of the downward tongue facing toward the downward flank extends in the direction of the normal of the lower side of the core, at least a part of a side of the downward tongue facing away from the downward flank forms an aligning edge for the purpose of coupling the second coupling part to a first coupling part of an adjacent floor panel, the downward flank is provided with a second locking element which is connected substantially rigidly to the downward flank and adapted for co-action with a first locking element of a first coupling part of an adjacent floor panel, wherein the upward groove is adapted to receive at least a part of a downward tongue of an adjacent panel, and wherein the downward groove is adapted to receive at least a part of an upward tongue of an adjacent panel. Because the coupling parts are given a specific form and moreover take a (somewhat) resilient form, the substantially complementarily formed coupling parts of adjacent floor panels can be coupled to each other relatively simply, but durably and efficiently. During coupling of adjacent floor panels a force will here be exerted on one or both coupling parts, whereby the one or both coupling parts will deform elastically (move resiliently), as a consequence of which the volume taken up by the downward groove and/or upward groove will be increased such that the upward tongue and the downward tongue can be arranged relatively simply in respectively the downward groove and the upward groove. By subsequently allowing the forced coupling parts to move back resiliently to the original position a reliable, locked coupling will be realized between the two coupling parts, and thereby between the two floor panels. This locked coupling, wherein both coupling parts mutually engage in relatively reliable manner, will counter friction of parts of the coupling against each other, whereby the coupling as such will generally generate relatively little noise. The applied aligning edges, generally also referred to as chamferings or guide surfaces, herein facilitate hooking together of the two coupling parts by the substantially linear displacement of the coupling parts relative to each other. Applying the mutually co-acting locking elements prevents a substantially vertical displacement of the two floor panels relative to each other. Because both the first locking element and the second locking element are connected substantially rigidly to respectively the upward tongue and the downward flank, a relatively durable and strong locking can be realized, since no use is made of relatively weak resilient locking parts in which material fatigue could moreover occur relatively quickly. The locking in the floor panel according to the invention is realized by deforming the first coupling part and/or the second coupling part relative to the core, whereby the locking elements can engage round each other or into each other. As a result of the rigid connection to the upward tongue and the downward flank, deformation of the locking elements themselves does not occur, or hardly so. The first locking element can otherwise form an integral part of the upward tongue, wherein the first locking element can for instance be formed by a protruding (outward bulging) or recessed (inward bulging) edge deformation of the upward tongue. The second locking element can also form an integral part of the downward tongue, wherein the second locking element can for instance be formed by a recessed or protruding edge deformation of the downward flank. The upward groove of the first coupling part will generally be given a form such that it is adapted for receiving in locked manner at least a part of a downward tongue of a second coupling part of an adjacent floor panel. A first locking will thus be formed by confining the downward tongue of a floor panel in the upward groove of an adjacent floor panel and by confining the upward tongue of the adjacent floor panel in the upward groove of the floor panel, and a second locking will be formed by applying the locking elements. The normal is understood to mean a normal vector of a plane, i.e. a vector perpendicular to this plane and thus originating from said plane. If the upper side or the lower side of the core were to be not completely flat, for instance because the upper side or the lower side of the core takes a form which is (to some extent) profiled, a plane formed by the upper side or lower side of the core can then be taken as basis to enable definition of an unambiguous direction of the normal of the upper side or the lower side of the core. Since the floor panel will generally support on a flat, horizontal surface, the direction of the normal of both the upper side of the core and the lower side of the core will then be oriented substantially vertically. The characteristic orientation of the side of the upward tongue facing toward the upward flank, the side of the downward tongue facing toward the downward flank, provides for a first locking mechanism (inner lock) during coupling of the floor panel to an adjacent floor panel. This is because, owing to the characteristic inclining orientation of the tongue walls facing toward the respective flanks, the exerting of (for instance) a vertical force on the coupling is not likely to result in an uncoupling of the co-acting coupling parts, since the relevant tongue walls are pressed against each other, which is a considerable constraint to the tongue walls sliding off each other and subsequent uncoupling of the coupling parts. In addition, at a distance from the first locking mechanism a second locking mechanism (outer lock) is formed by the locking elements which co-act mutually, and furthermore at a distance from the above mentioned (inner) tongue walls, in a coupled position of two floor panels. In the case of possible failure of one of the locking mechanisms, securing of the coupling between the two floor panels will be maintained as far as possible, this resulting in a relatively reliable coupling between the two floor panels, whereby undesirable mutual displacement or uncoupling of the floor panels can be prevented as far as possible. Because the floor panel according to the invention will realize a multiple locking when the floor panel is coupled to an adjacent floor panel, a relatively firm, reliable and durable connection can be realized between the floor panels.

In a preferred embodiment at least one coupling part comprises a bridge part connected to the core and an end part connected resiliently to the bridge part, wherein the end part is adapted to move resiliently (elastically) in a direction enclosing an angle, in particular a substantially perpendicular angle, with a plane formed by the core. The end parts of the coupling parts thus generally move resiliently in upward and/or downward direction here. The upward flank of the first coupling part herein forms part of the bridge part of the first coupling part, wherein the upward tongue of the first coupling part forms part of the end part of the first coupling part. The downward flank of the second coupling part herein also forms part of the bridge part of the second coupling part, wherein the downward tongue of the second coupling part forms part of the end part of the second coupling part. As already indicated, the grooves of the coupling parts can be temporarily widened by means of resilient movement, whereby realizing a coupling between the two coupling parts can be facilitated.

In order to particularly increase the tensile strength of an assembly of coupled floor panels, the coupling parts are designed such that at least a part of a side of the upward tongue facing toward the upward flank extends in the direction of the normal of the upper side of the core, and that at least a part of a side of the downward tongue facing toward the downward flank extends in the direction of the normal of the lower side of the core.

Each of the upward tongue and the downward tongue is preferably substantially rigid, which means that the tongues are not configured to be subjected to deformation. The tongues as such are relatively stiff and hence non-flexible. Moreover, the tongues are preferably substantially solid, which means that the tongues are substantially massive and thus completely filled with material and are therefore not provided with grooves at an upper surface which would weaken the construction of the tongue and hence of the floor panel connection to be realised. By applying a rigid, solid tongue a relatively firm and durable tongue is obtained by means of which a reliable and the durable floor panel connection can be realised without using separate, additional components to realise a durable connection.

In an embodiment of the floor panel, at least a part of the upward flank adjoining the upper side of the floor panel is adapted to make contact with at least a part of the downward tongue adjoining the upper side of another floor panel in a coupled state of these floor panels. Engagement of these surfaces will lead to an increase of the effective contact surface between the coupling elements and hence to an increase of stability and sturdiness of the connection between two floor panels. In a favorable embodiment the upper side of the floor panel is adapted to engage substantially seamless to the upper side of another floor panel, as a result of which a seamless connection between two floor panels, and in particular the upper surfaces thereof, can be realised.

In another embodiment the first locking element is positioned at a distance from an upper side of the upward tongue. This is favorable, since this will commonly result in the situation that the first locking element is positioned at a lower level than the upward aligning edge of the floor panel, which has the advantage that the maximum deformation of the second coupling part can be reduced, whereas the connection process and deformation process can be executed in successive steps. Less deformation leads to less material stress which is in favor of the life span of the coupling part(s) and hence of the floor panel(s). In this embodiment the second locking element is complementary positioned at a distance from an upper side of the downward groove.

In yet another embodiment the effective height of the downward aligned edge is larger than the effective height of the upward tongue. This commonly results in the situation that the downward aligning edge of a floor panel does not engage another floor panel in case of a pre-aligned state (intermediate state), as shown e.g. in FIG. 18. The position-selective contactless pre-alignment does prevent or counter-act forcing the downward aligning edge of a floor panel along the upper surface of another floor panel, which could damage the floor panels.

In an embodiment the mutual angle enclosed by at least a part of a side of the upward tongue facing toward the upward flank and the normal of the upper side of the core is substantially equal to the mutual angle enclosed by at least a part of a side of the downward tongue facing toward the downward flank and the normal of the lower side of the core. A close-fitting connection of the two tongue parts to each other can hereby be realized, this generally enhancing the firmness of the coupling between the two floor panels. In an embodiment variant the angle enclosed by on the one hand the direction in which at least a part of a side of the upward tongue facing toward the upward flank extends and on the other the normal of the upper side of the core lies between 0 and 60 degrees, in particular between 0 and 45 degrees, more particularly between 0 and 10 degrees. In another embodiment variant the angle enclosed by on the one hand the direction in which at least a part of a side of the downward tongue facing toward the downward flank extends and on the other the normal of the lower side of the core lies between 0 and 60 degrees, in particular between 0 and 45 degrees, more particularly between 0 and 10 degrees. The eventual inclination of the tongue side facing toward the flank usually also depends on the production means applied to manufacture the floor panel. In an embodiment inclination of the downward aligned edge is less than the inclination of at least an upper part of the upward flank, as result of which an expansion chamber will be formed between both surface which will be favorable to allow play and to compensate expansion, e.g. due to moist absorption by the floor panels.

In a variant at least a part of an upper side of the upward tongue extends in a direction toward the normal of the upper side of the core. This has the result that the thickness of the upward tongue decreases in the direction of the side of the tongue facing away from the upward flank. By having the downward groove substantially connect to the upper side of the upward tongue, in a coupled position of two floor panels according to the invention wherein an upper side of the downward groove extends in the direction of the normal of the lower side of the core, a second coupling part can be provided which is on the one hand relatively strong and solid and can on the other guarantee sufficient resilience to enable a coupling to be realized to a first coupling part of an adjacent floor panel.

The aligning edges are preferably formed by a flat surface so as to allow guiding of another coupling part during the process of coupling two floor panels to proceed be generally in as controlled a manner as possible. In another embodiment variant at least a part of the aligning edge of the second coupling part has a substantially flatter orientation than at least a part of the upward flank of the first coupling part. By applying this measure there is generally created in a coupled position an air gap between the aligning edge of the second coupling part and a flank of the first coupling part. This clearance intentionally created between the two coupling parts is usually advantageous during coupling of adjacent floor panels, since this clearance does not prevent a temporary deformation of the coupling parts, this facilitating coupling of the coupling parts. Furthermore, the created clearance is advantageous for the purpose of absorbing expansion of the floor panel, for instance resulting from moisture absorption, this not being inconceivable when the floor panel is at least partially manufactured from wood.

In an embodiment variant a part of the upward flank of the first coupling part connecting to the core forms a stop surface for at least a part of the side of the downward tongue facing away from the downward flank. In this way a close fitting of at least the upper side of the floor panels can be realized, this usually being advantageous from a user viewpoint. A part of the upward flank of the first coupling part connecting to the core is here preferably oriented substantially vertically. At least a part of the side of the downward tongue facing away from the downward flank is here also preferably oriented substantially vertically. Applying substantially vertical stop surfaces in both coupling parts has the advantage that in the coupled position the coupling parts can connect to each other in relatively close-fitting and firm manner.

It is generally advantageous for the upward groove to be adapted to receive with clamping fit a downward tongue of an adjacent panel. Receiving the upward groove, or at least a part thereof, with clamping fit in the downward tongue has the advantage that the downward tongue is enclosed relatively close-fittingly by the upward groove, this usually enhancing the firmness of the coupled construction. The same applies for the embodiment variant in which the downward groove is adapted to receive with clamping fit an upward tongue of an adjacent panel.

In an embodiment variant the upward flank and the downward flank extend in a substantially parallel direction. This makes it possible to connect the flanks, as well as the locking elements, relatively closely to each other in a coupled position, this generally enhancing the locking effect realized by the locking elements.

In another embodiment variant the first locking element comprises at least one outward bulge, and the second locking element comprises at least one recess, which outward bulge is adapted to be at least partially received in a recess of an adjacent coupled floor panel for the purpose of realizing a locked coupling. This embodiment variant is generally advantageous from a production engineering viewpoint. The first locking element and the second locking element preferably take a complementary form, whereby a form-fitting connection of the locking elements of adjacent floor panels to each other will be realized, this enhancing the effectiveness of the locking.

In an embodiment of the floor panel according to the invention the first locking element is positioned at a distance from an upper side of the upward tongue. Positioning the first locking element at a distance from the upper side of the upward tongue has a number of advantages. A first advantage is that this positioning of the first locking element can facilitate the coupling between adjacent floor panels, since the first locking element will be positioned lower than (a lower part of) the aligning edge of the upward tongue, whereby the coupling between two coupling parts can be performed in stages. During the coupling process the tongue sides facing toward the associated flanks will first engage each other, after which the locking elements engage each other, this generally requiring a less great maximum pivoting (amplitude), and thereby deformation of a second coupling part of an adjacent floor panel, than if the first aligning edge and the first locking element were to be located at more or less the same height. A further advantage of positioning the first locking element at a distance from an upper side of the upward tongue is that the distance to the resilient connection between each coupling part and the core, generally formed by the resilient bridge of each coupling part, is increased, whereby a torque exerted on the coupling parts can be compensated relatively quickly by the locking elements, which can further enhance the reliability of the locking.

It is possible to envisage the first coupling part comprising a plurality of upward tongues lying at a distance from each other, wherein an upward groove is positioned between each two adjacent upward tongues, and the second coupling part comprising a plurality of downward grooves positioned a distance from each other for the purpose of receiving the above stated upward tongues.

In an embodiment a plurality of sides of the floor panel comprise a first coupling part, and a plurality of sides of the floor panel comprise a second coupling part, wherein each first coupling part and each second coupling part lie on opposite sides of the floor panel. In this way each side of the floor panel can be provided with a coupling part, this increasing the coupling options of the floor panel. By positioning the first coupling part and the second coupling part on opposite sides it will be relatively simple for a user to lay a floor formed by floor panels according to the invention, since each floor panel can be formed in the same way.

The first coupling part and the second coupling part preferably form an integral part of the core. From a structural, production engineering and logistics viewpoint this integral connection between the core and the coupling parts is generally recommended.

In an embodiment variant the floor panel is manufactured at least partially from wood. The floor panel can herein form a wooden plank and/or a parquet floor panel. The floor panel according to the invention is however also exceptionally suitable for application as laminated floor panel, wherein the floor panel comprises a laminate of a carrier layer comprising a wood product and at least one top layer arranged on an upper side of the carrier layer. The top layer will here generally take a hardened (wear-resistant) and transparent form, and in particular be impregnated with resin. The carrier layer generally comprises a wood fibreboard, in particular an MDF board (Medium Density Fibreboard) or HDF board (High Density Fibreboard). Between the top layer and the carrier layer can be arranged a decorative layer generally formed by a photo of wood or of tiles printed on paper usually saturated in melamine resin. A wood or tile structure can further be pressed into the top layer, whereby the top layer in fact also forms an embossed layer. The top layer can also be manufactured at least partially of plastic, metal or textile, in particular carpet. It is also possible to envisage the floor panel being manufactured wholly from plastic, metal and/or textile instead of being manufactured from wood.

In an embodiment variant the floor panel is manufactured at least partially from plastic. It is possible here to envisage the floor panel according to the invention being manufactured substantially wholly from plastic.

The invention also relates to a floor covering consisting of mutually coupled floor panels according to the invention.

The invention further relates to a method for mutually connecting two floor panels according to the invention, comprising the steps of: A) having a second coupling part of a first floor panel engage on a first coupling part of a second floor panel, B) exerting a force on the second coupling part of the first floor panel in the direction of the first coupling part of the second floor panel, such that an end part of the second coupling part of the first floor panel will pivot in upward direction and/or an end part of the first coupling part of the second floor panel will pivot in a downward direction, whereby a downward tongue of the second coupling part of the first floor panel is arranged at least partially, in particular substantially, in an upward groove of the first coupling part of the second floor panel, and C) releasing the force exerted during step B), whereby the at least one deformed coupling part will pivot back to an initial position and the downward tongue of the second coupling part of the first floor panel will be locked in the upward groove of the first coupling part of the second floor panel. During step A) an intermediate state is realised wherein the floor panels are pre-aligned with respect to each other. During step B) a substantially linear displacement of the floor panels relative to each other will generally take place here, which results in a temporary deformation of at least one of the coupling parts and the subsequent realizing of a snap connection between the two coupling parts. In the coupled position the first coupling part and the second coupling part will generally no longer be deformed, and the first coupling part and the second coupling part will have once again assumed the substantially original (relaxed) form. It is expected that this relaxation in the coupled position enhances the durability of the coupling parts, and thereby the durability of the coupling of the floor panels. In an embodiment during step A) the second coupling part of the first floor panel engages both a side of the upward tongue facing towards the upward flank and a side of the upward tongue facing away from the upward flank of the second coupling part of the second floor panel, as a result of which a relatively stable intermediate state (pre-alignment state) can he realised. In another embodiment during step A) the aligning edge of the first coupling part of the first floor panel is positioned at a distance from the second coupling part of the second floor panel, which will facilitate coupling of the floor panels, and which will prevent scraping of (the upper surface of) the floor panels against each other, which could undesirably damage the floor panels.

BRIEF DESCRIPTION OF THE DRAWINGS

The invention will be elucidated on the basis of non-limitative exemplary embodiments shown in the following figures herein:

FIG. 1 is a side view of a floor panel according to the invention,

FIG. 2 is a side view of an assembly of coupled floor panels according to FIG. 1, FIG. 3 is a side view of another floor panel according to the invention, FIG. 4 is a side view of a part of an assembly of coupled floor panels according to FIG. 3, FIG. 5 is a perspective view of the floor panel according to FIG. 3.

DESCRIPTION OF THE INVENTION

Figure 6:
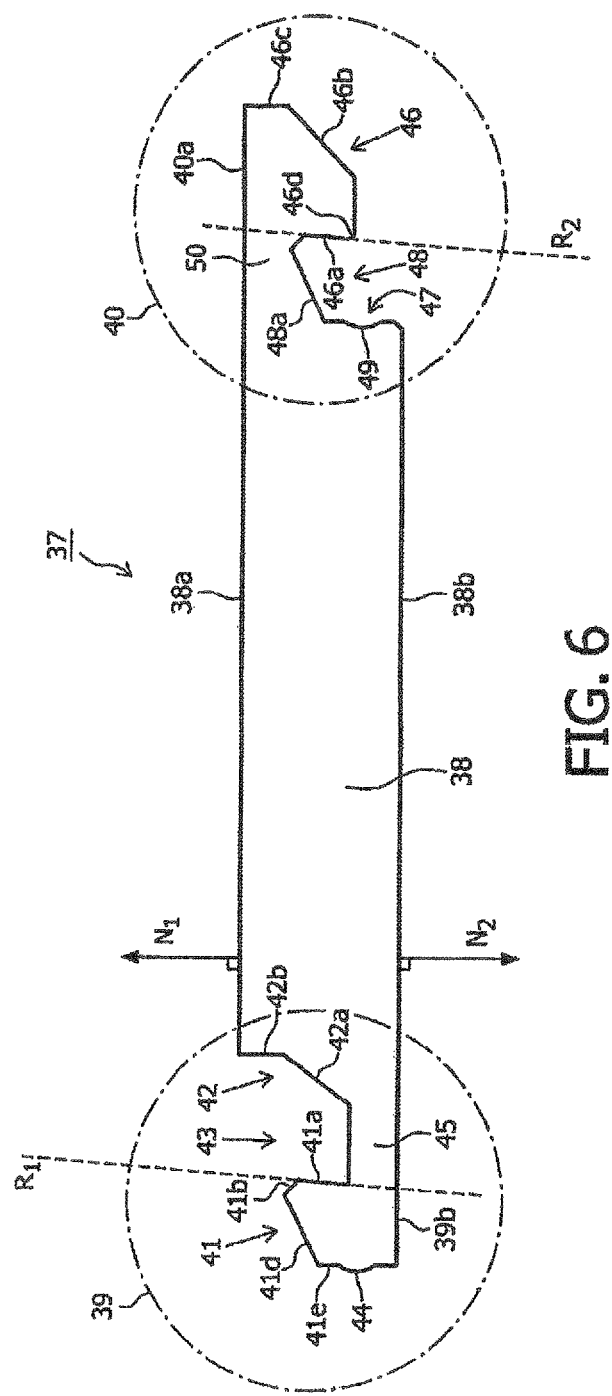
FIG. 6 is a transverse side view of yet another floor panel according to the invention.

FIG. 1 shows a side view of a floor panel 1 according to the invention. Floor panel 1 comprises a plate-like core 2 which is manufactured from fibreboard, in particular MDF (Medium Density Fibreboard) or HDF (High Density Fibreboard) or chipboard and on which a top layer 3 is arranged. The opposite longitudinal sides of core 2 are provided with a first coupling part 4 and a second coupling part 5. The part of floor panel 1 lying between first coupling part 4 and second coupling part 5, as indicated by means of the broken lines, forms the central part 6 of floor panel 1. First coupling part 4 comprises an upward tongue 7, an upward flank 8 and an upward groove 9 formed between upward tongue 7 and upward flank 8. Second coupling part 5 comprises a downward tongue 10, a downward flank 11 and a downward groove 12 formed between downward tongue 10 and downward flank 11. As shown, upward tongue 7, upward flank 8 and upward groove 9 extend in the direction (indicated by means of arrow A) of the normal of central part 6 (indicated by means of arrow N1) of the central floor part 1. The same applies for the direction in which the downward tongue 10, downward flank 11 and downward groove 12 extend (see arrows B and N2). In this exemplary embodiment the angle ⌐ enclosed by arrows A and N1 is equal to the angle ☐ enclosed by arrows B and N2, these angles equaling 30°. The first coupling part 4 is provided with a ridge 13 which in the coupled situation co-acts with a recess 14 arranged in a second coupling part 5 of an adjacent floor panel 1 (see FIG. 2) for the purpose of realizing a locking between the two floor panels 1. In addition, both coupling parts 4, 5 are provided with a protective lip 15, 16 adapted to be received in a complementary receiving space 17, 18 of coupling parts 4, 5. Downward tongue 10 is provided with an angled outer end 10a, of which one side is positioned substantially horizontally and one side substantially vertically. Formed in this way are a substantially horizontal stop surface and a substantially vertical stop surface adapted for co-action with the complementarily formed upward groove 9, whereby stabilizing (locking) of the coupling between the two floor panels 2 occurs (see FIG. 2), As shown in FIG. 2, coupling parts 4, 5 engage form-fittingly into each other. Coupling can take place by simply displacing first coupling part 4 of a floor panel 1 in linear direction (indicated by means of arrow C) in the direction of second coupling part 2 of an adjacent floor panel 1, whereby the coupling parts engage fixedly in each other. Horizontal forces exerted on the assembly, resulting for instance from shrinkage or expansion of floor parts 1, or vertical forces exerted on the assembly, resulting for instance from expansion of floor parts 1, will not adversely affect the realized coupling, whereby no uncoupling of floor parts 1 or forming of gaps between floor parts 1 will take place.

FIG. 3 shows a side view of another floor panel 19 according to the invention. Floor panel 19 comprises a plate-like core 20 which is manufactured from fibreboard, in particular MDF (Medium Density Fibreboard) or HDF (High Density Fibreboard) or chipboard and on which a top layer 21 is arranged. The opposite longitudinal sides of core 20 are provided with a first coupling part 22 and a second coupling part 23 which is complementary relative to first coupling part 22. The part of floor panel 19 located between first coupling part 22 and second coupling part 23, as indicated by means of the broken lines, is designated the central part 24 of floor panel 19. First coupling part 22 comprises an upward tongue 25, an upward flank 26 and an upward groove 27 formed between upward tongue 25 and upward flank 26. Second coupling part 23 comprises a downward tongue 28, a downward flank 29 and a downward groove 30 formed between downward tongue 28 and downward flank 29. As shown, upward tongue 25, upward flank 26 and upward groove 27 extend in the direction (indicated by means of arrows A1, A2 and A3) of the normal of central part 24 (indicated by means of arrow N) of floor panel 19. The same applies for the direction in which downward tongue 28 and downward groove 30 extend (see arrows B1 and B3). Downward flank 29 extends in this exemplary embodiment in a direction substantially the same as the normal of central part 24 of floor panel 19. As shown, first coupling part 22 is provided with a outward bulge 31 and second coupling part 23 is provided with a complementary recess 32 for the purpose of being able to realize a locking during coupling of floor panel 19 to an adjacent floor panel 19 (see FIG. 4). As shown in FIG. 4, upward groove 27 of first coupling part 22 of a floor panel 19 and a downward tongue 28 of a second coupling part 23 of an adjacent floor panel 19 mutually enclose an air space 33. FIG. 5 further shows that side edges 34 (end surfaces) of floor panel 19 are provided with an upward profile 35 and a complementary downward profile 36 for realizing a lateral coupling between two floor panels 19 positioned against each other on end surfaces 34.

FIG. 6 shows a side view of yet another rectangular floor panel 37 according to the invention. Floor panel 37 comprises a core 38 provided with an upper side 38a and a lower side 38b, and coupling parts 39, 40 positioned on opposite longitudinal sides of core 38 and connected integrally to core 38. A first coupling part 39 comprises an upward tongue 41, an upward flank 42 and an upward groove 43 formed between upward tongue 41 and upward flank 42. A side 41a of upward tongue 41 facing toward upward flank 42 extends in the direction of the normal N1 of the upper side 38a of core 38. The tangent R1 and the normal N1 of upper side 38a of core 38 are thus directed toward each other (converging orientation), wherein the angle enclosed by R1 and N1 amounts to 5 degrees. Another side 41b of upward tongue 41 facing toward upward flank 42 forms an aligning edge enabling facilitated realization of a coupling to an adjacent floor panel. As shown, this side 41b functioning as aligning edge is directed away from the normal N1 of upper side 38a of the core. An upper side 41d of upward tongue 41 does however extend in the direction of the normal N1 of upper side 38a of core 38, and runs inclining downward in the direction of the side 41e of upward tongue 41 facing away from upward flank 42. This chamfering provides the option of giving the complementary second coupling part 40 a more robust and therefore stronger form. The side 41e of upward tongue 41 facing away from upward flank 42 is oriented substantially vertically and is moreover provided with an outward bulge 44. A lower part 42a of upward flank 42 is oriented diagonally, while an upper part 42b of upward flank 42 is shown to be substantially vertical and forms a stop surface for second coupling part 40. A lower wall part 43a of upward groove 43 is oriented substantially horizontally in this exemplary embodiment. A bridge 45 lying between lower wall part 43a of upward groove 43 and a lower side 39a has a somewhat elastic nature and is adapted to allow upward tongue 41 to pivot relative to upward flank 42, this resulting in a (temporary) widening of upward groove 43, whereby coupling of floor panel 37 to an adjacent floor panel can be facilitated (see FIGS. 7A-7F). Second coupling part 40 is substantially complementary to first coupling part 39. Second coupling part 40 comprises a downward tongue 46, a downward flank 47 and a downward groove 48 formed between downward tongue 46 and downward flank 47. A side 46a of downward tongue 46 facing toward downward flank 47 lies in the direction of the normal N2 of the lower side 38b of core 38. This means that a tangent R2 of side 46a of downward tongue 46 and the normal of the lower side 38b of core 38 are mutually converging. In this exemplary embodiment the tangent R2 and the normal N2 enclose a mutual angle of 5 degrees. A side 46b facing away from downward flank 47 is diagonally oriented, but has a flatter orientation that the complementary side 42a of upward flank 42, whereby a gap (air space) will be formed in the coupled position (see also FIG. 7F), which will generally facilitate coupling between two floor panels 37. The inclining side 46b of downward tongue 46 also functions as aligning edge for the purpose of further facilitating coupling between two floor panels 37. Another side 46c facing away from downward flank 47 takes a substantially vertical form and forms a complementary stop surface for stop surface 42b of upward flank 42 (of an adjacent floor panel). Downward tongue 46 is further provided with a side 46d which is facing toward downward flank 47 and which functions as aligning edge for first coupling part 39 of an adjacent floor panel. Because upper side 41d of upward tongue 41 has an inclining orientation, an upper side 48a of downward groove 48 likewise has an inclining orientation, whereby the (average) distance between upper side 48a of downward groove 48 and an upper side 40a of second coupling part 40 is sufficiently large to impart sufficient strength to second coupling part 40 as such. Downward flank 47 is oriented substantially vertically and is provided with a recess 49 adapted to receive the outward bulge 44 of upward tongue 41 (of an adjacent floor panel).

A bridge 50 lying between upper side 48a of downward groove 48 and upper side 40a has a somewhat elastic nature and is adapted to allow downward tongue 46 to pivot relative to downward flank 47, this resulting in a (temporary) widening of downward groove 48, whereby coupling of floor panel 37 to an adjacent floor panel can be facilitated (see FIGS. 7A-7F). The shown floor panel 37 can form a parquet floor panel, a plank, a laminated floor panel or a plastic floor panel.

Figure 7A:
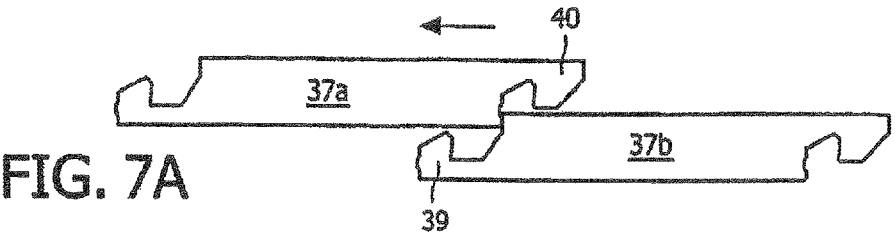
FIGS. 7A-7F show successive method steps for realizing a coupling between two floor panels according to FIG. 6.
Figure 7B:
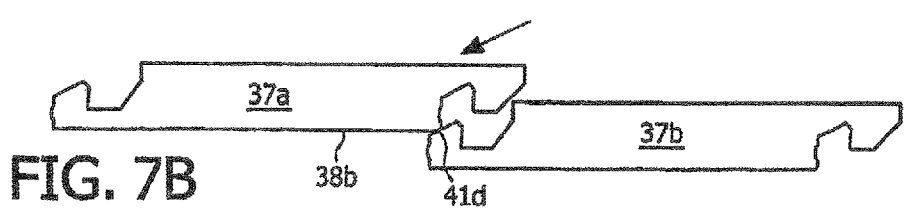
Figure 7C:
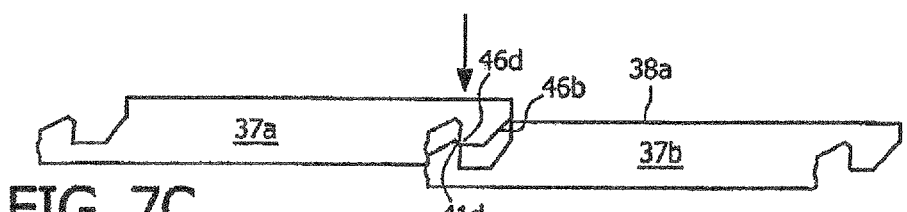
Figure 7D:
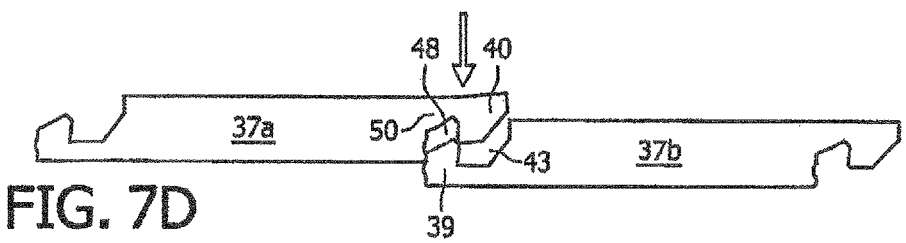
Figure 7E:
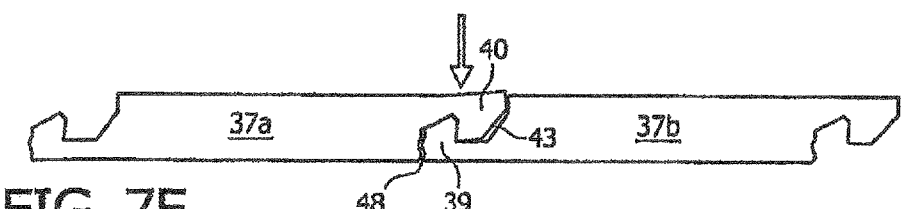
Figure 7F:
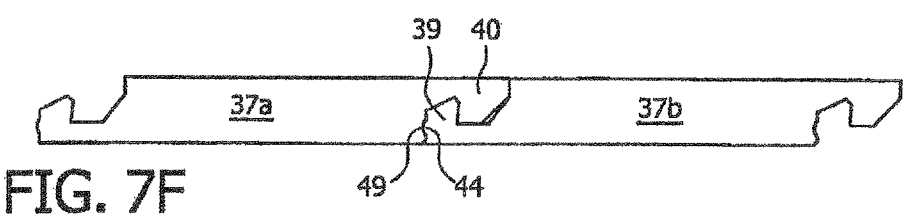

FIGS. 7A-7F show successive method steps for realizing a coupling between two floor panels 37a, 37b as according to FIG. 6. In a first (optional) step as shown in FIG. 7A, second coupling part 40 of a first floor panel 37a is displaced in the direction of first coupling part 39 of a second floor panel 37b by sliding first floor panel 37a over second floor panel 37b (see arrow). As shown in FIG. 7B, second coupling part 40 of first floor panel 37a will then be brought into line with first coupling part 39 of second floor panel 37b by having the lower side 38b of core 38 of the first floor panel 37a slide along upper side 41d of upward tongue 41 of second floor panel 37b (see arrow) until aligning edge 46a of downward tongue 46 of first floor panel 37a supports on aligning edge 41b of upward tongue 41 of second floor panel 37b (FIG. 7C). The other aligning edge 46b of downward tongue 46 of first floor panel 37 will generally also make contact here with upper side 38a of core 38. By now exerting a downward force on at least bridge 50 of second coupling part 40 of first floor panel 37a, downward tongue 46 will pivot in upward direction relative to downward flank 47, wherein upward tongue 41 of second floor panel 37b will generally also pivot relative to upward flank 42 of second floor panel 37b (FIG. 7D). During this temporary deformation of coupling parts 39, 40 both the downward groove 48 of first floor panel 37a and the upward groove 43 of second floor panel 37b will be widened such that downward tongue 46 of first floor panel 37a can be arranged at least partially in upward groove 43 of second floor panel 37b, and upward tongue 41 of second floor panel 37b can be arranged at least partially in downward groove 48 of first floor panel 37a (FIG. 7E). After the force on floor panels 37a, 37b has been released, the deformation will be substantially ended, and floor panels 37a, 37b will be mutually coupled. An additional locking is realized here in that locking elements 44, 49 of both floor panels 37a, 37b are mutually co-acting in the coupled position. Uncoupling of floor panels 37a, 37b can otherwise take place by moving the free outer end, facing away from second floor panel 37b, of first floor panel 37a in upward direction, after which floor panels 37a, 37b will click loose of each other. Movement of first floor panel 37a in upward direction can optionally be facilitated by making use of a tool, such as for instance a wedge. Another method of disassembling floor panels 37a, 37b is to slide floor panels 37a, 37b along each other, whereby coupling parts 39, 40 can be removed from each other, which will result in uncoupling of floor panels 37a, 37b.

Figure 8:
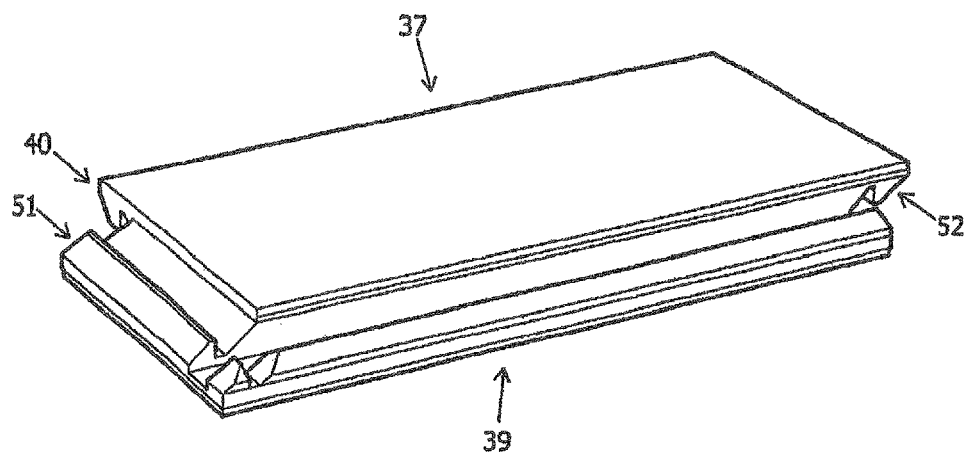
FIG. 8 is a perspective view of the floor panel according to FIGS. 6 and 7.
Figure 9:
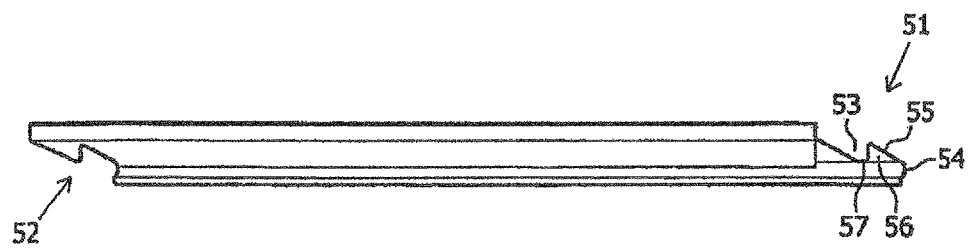
FIG. 9 is another transverse side view of the floor panel according to FIGS. 6-8, FIGS. 10A-10G show a first method for laying a floor constructed from floor panels according to FIGS. 6-9, FIGS. 11A-11G show a second method for laying a floor constructed from floor panels according to FIGS. 6-9.
Figure 10B:
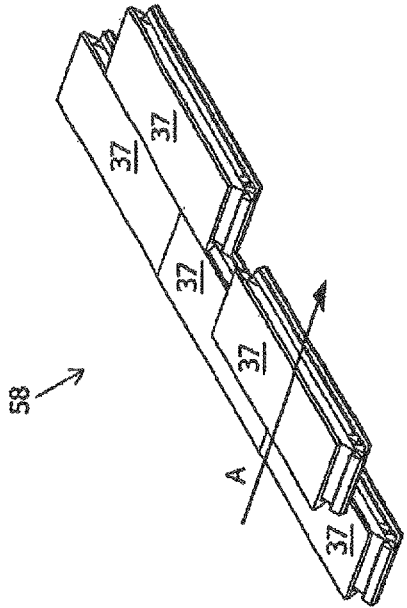
Figure 10D:
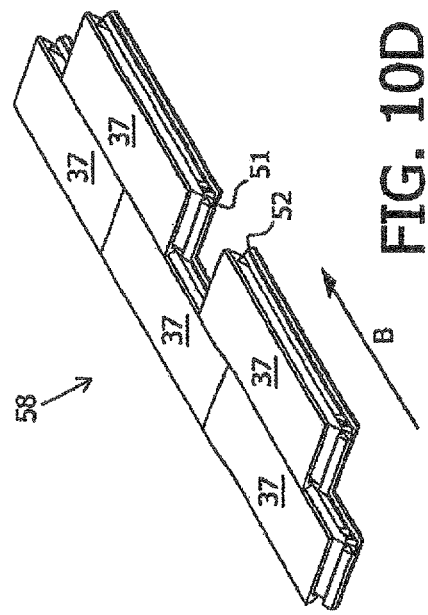
Figure 10A:
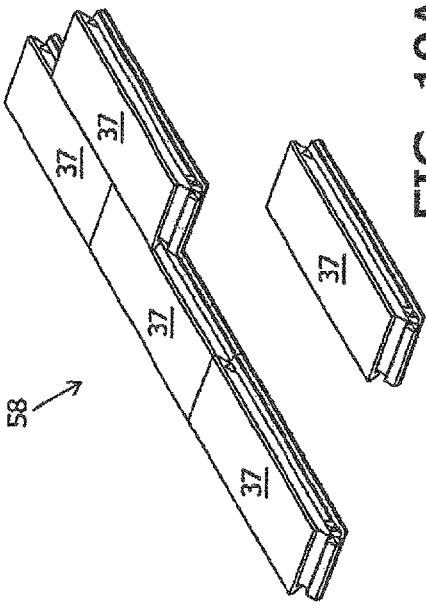
Figure 10C:
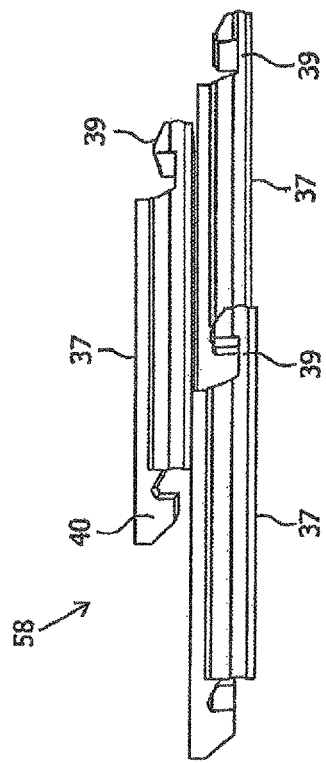
Figure 10F:
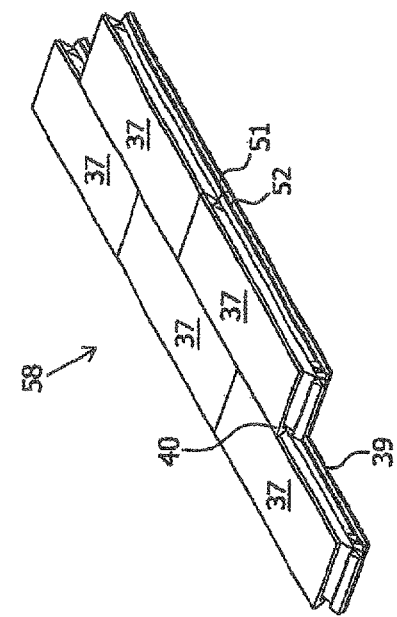
Figure 10E:
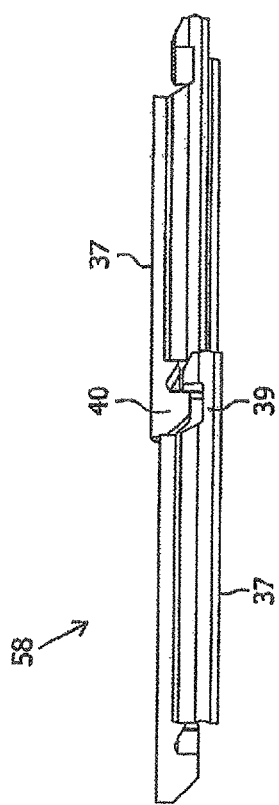
Figure 10G:
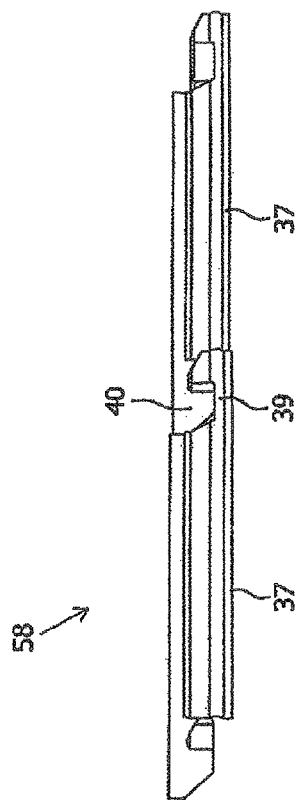
Figure 11A:
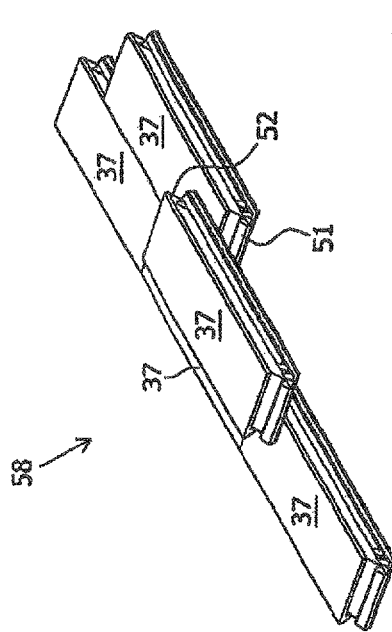
Figure 11B:
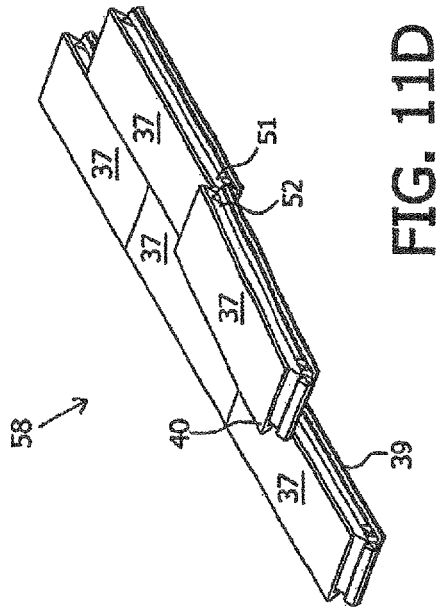
Figure 11C:
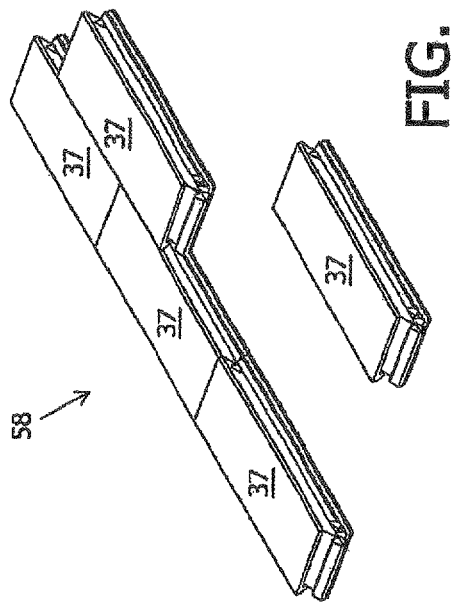
Figure 11D:
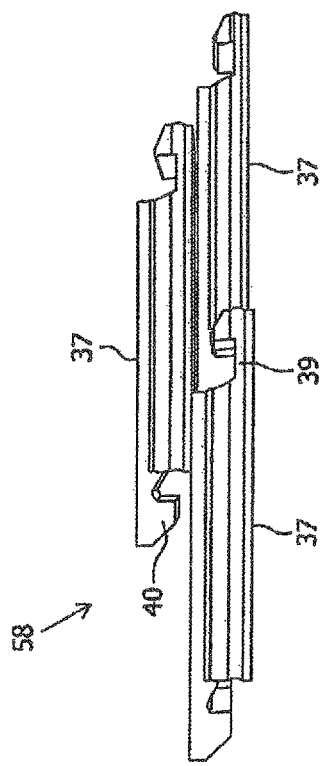
Figure 11F:
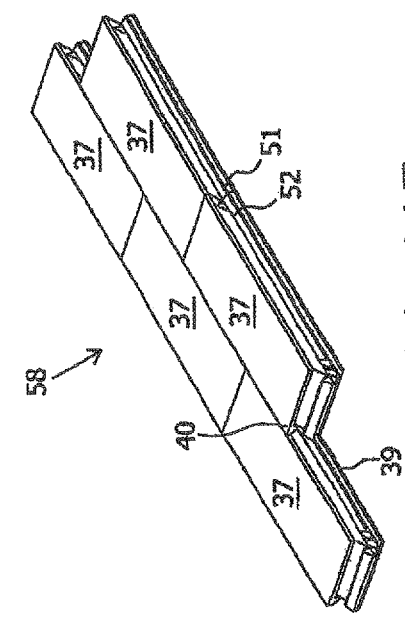
Figure 11E:
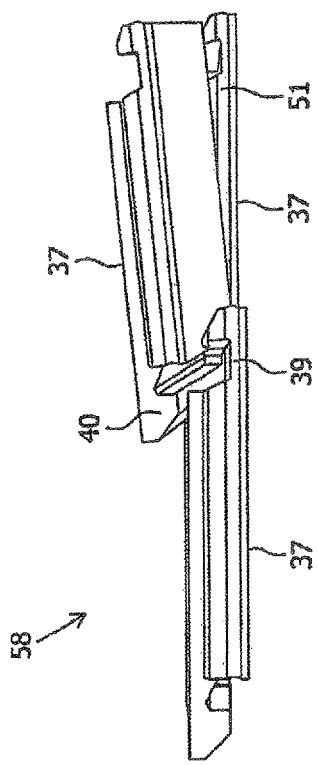
Figure 11G:
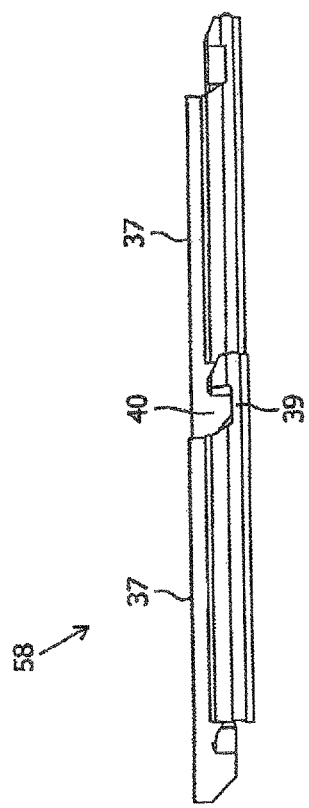

FIG. 8 shows a perspective view of floor panel 37 according to FIGS. 6 and 7, which also shows that a first coupling part 51 and a second coupling part 52 are positioned on the opposite short sides of the rectangular floor panel 37. A transverse side view of the short sides of floor panel 37 is shown in FIG. 9. As shown, first coupling part 51 largely corresponds structurally to the construction of first coupling part 39 shown in FIG. 6, and second coupling part 52 largely corresponds structurally to the construction of second coupling part 40 shown in FIG. 6. However, first coupling part 51 shown in FIG. 8 comprises a less deep upward groove 53 compared to upward groove 43 of the long side of floor panel 37 as shown in FIG. 6. Furthermore, a first locking element 54 connects to an upper side 55 of an upward tongue 56 of first coupling part 51. A flat lower side 57 defining upward groove 43 further has smaller dimensions than this lower side as shown in FIG. 6, and upward tongue 56 has smaller dimensions than upward tongue 41 as shown in FIG. 6. The second coupling part 52 shown in FIG. 8 is correspondingly modified relative to second coupling part 40 as shown in FIG. 6. The dimensioning of the first coupling part 51 and second coupling part 52 arranged on the short sides relative to the first coupling part 39 and second coupling part 40 positioned on the long sides is particularly intended to facilitate mutual coupling of floor panels 37, as further shown in FIGS. 10A-10G (first method) and FIGS. 11A-11G (second method).

FIGS. 10A-10G show a first method of laying a floor 58 constructed from floor panels 37 as according to FIGS. 6-9. When a floor panel 37a has to be coupled to already laid floor panels 37 (FIG. 10A), the relevant floor panel 37 can then be pushed in transverse direction (see arrow A) over the already laid floor panels 37 (FIGS. 10B and 10C), wherein first coupling part 39 of one or more already laid floor panels 37 is coupled to second coupling part 40 of the floor panel 37 for laying. After coupling of the longitudinal sides of floor panels 37 the floor panel 37 for laying is pushed in longitudinal direction (see arrow B) (FIGS. 10D and 10E), whereby the short sides of the floor panels can be connected to each other by causing second coupling part 52 of the floor panel 37 for laying to co-act with first coupling part 51 of the adjacent floor panel 37.

FIGS. 11A-11G show a second method of laying a floor 58 constructed from floor panels 37 as according to FIGS. 6-9. When a floor panel 37a has to be coupled to already laid floor panels 37 (FIG. 11A), a corner point 37a of the relevant floor panel 37 for laying can then be positioned in a corner formed by already coupled floor panels (FIGS. 11B and 11C and successively FIGS. 11D and 11E), after which the floor panel 37 for laying is pivoted in downward direction, whereby second coupling part 40 of the floor panel 37 for laying will co-act with-in this case-a plurality of first coupling parts 39 of already laid floor panels 37, and whereby second coupling part 52 of the floor panel 37 for laying will co-act with first coupling part 51 of an adjacent floor panel 37. According to this second method, the long side and the short side are connected (more or less) simultaneously to each other.

Figure 12:
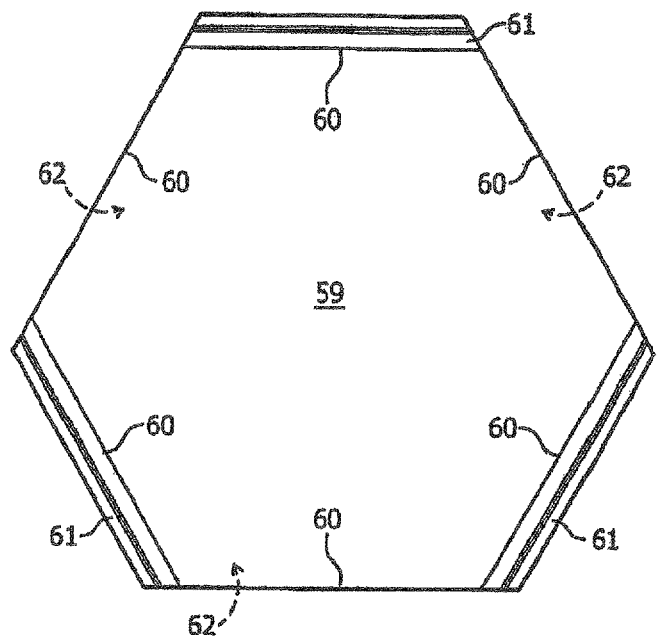
FIG. 12 is a top view of another embodiment of a floor panel according to the invention.

FIG. 12 shows a top view of an alternative floor panel 59 according to the invention. Floor panel 59 comprises six equal sides 60, wherein sides 60 are alternately provided with a first coupling part 61 and a second coupling part 62. First coupling part 61 is structurally identical to first coupling part 39 as shown in FIG. 6, and second coupling part 62 is structurally identical to second coupling part 40 as shown in FIG. 6. A floor can be manufactured with a honeycomb pattern by coupling the hexagonal floor panels 59 through co-action of first coupling parts 61 and second coupling parts 62 of different floor panels 59.

Figure 13:
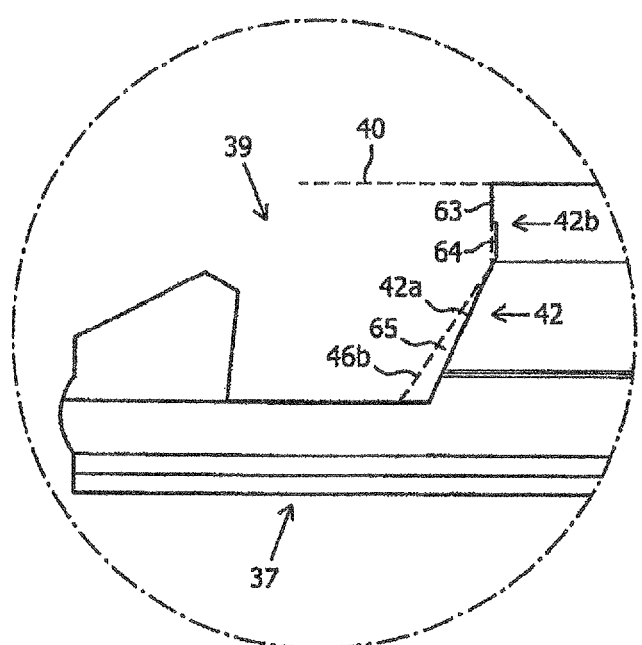
FIG. 13 shows a detail view of a part of the floor panel according to FIGS. 6-11G.

FIG. 13 shows a detail view of a part of floor panel 37 according to FIGS. 6-11G, wherein particularly the first coupling part 39 is shown. In addition to all particular surfaces already specified in the foregoing, FIG. 13 also shows that upper part 42b of upward flank 42 is shown substantially vertically and is provided with an offset, overhanging connecting surface 63. The advantage of applying an overhanging connecting surface 63 is that a second coupling part 40 of an adjacent panel 37 (indicated by means of broken lines) will be able to fit closely onto the overhanging connecting surface 63, wherein an air gap 64 is also formed between the two coupling parts 39, 40 just below the overhanging connecting surface 63. This clearance intentionally created between the two coupling parts 39, 40 is usually advantageous for the purpose of accurate connection of coupling parts 39, 40 to each other, since irregularities in the form of floor panel 37 or expansion of floor panel 37 can be compensated by air gap 64. Already stated above is that a side 46b facing away from the downward flank has a flatter orientation than the complementary side 42a of upward flank 42, whereby a further air gap 65 will also be formed in the coupled position, which will generally further facilitate coupling between two floor panels 37.

Figure 14:
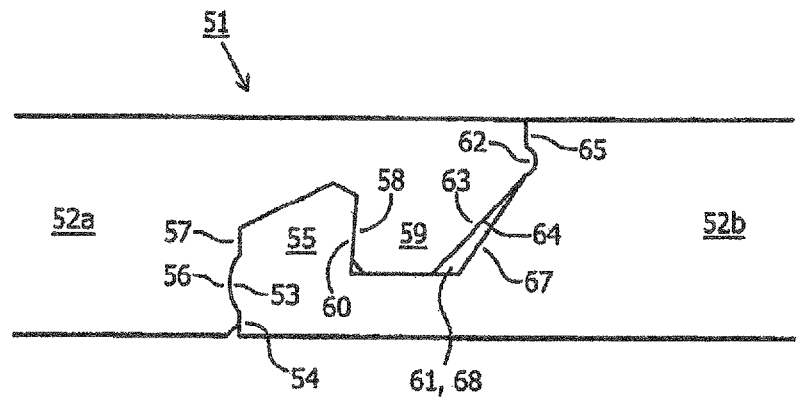
FIG. 14 shows a side view of a part of an assembly of another embodiment of connected floor panels according to the invention.

FIG. 14 shows a side view of a part of an assembly 51 of another embodiment of floor panels 52a, 52b according to the invention. From a constructive point of view the floor panel 52, 52b as shown is for a substantial part similar to the floor panel 37 as shown in FIG. 6, wherein the floor panels are mutually connected by means of three locking mechanism. A first locking mechanism is also present in the floor panel 37 as shown in FIG. 6, and is based upon the cooperation between an outward bulge 53 positioned at an outward surface 54 of an upward tongue 55 of the right floor panel 52b, and a recess 56 positioned at a downward flank 57 of the left floor panel 52a. A second locking mechanism, which is also present in the floor panel 37 as shown in FIG. 6, is formed by the engagement of an inclined surface 58 of the downward tongue 59 of the left floor panel 52a, to an inclined surface 60 of the upward tongue 55 which results in locking the downward tongue 59 of the left floor panel 52a into an upward groove 61 of the right floor panel 52b. A third locking mechanism is formed by the application of an additional outward bulge 62 positioned at an outer surface 63 of the downward tongue 59, and which is more in particular positioned between an aligning edge 64 and a vertical top end 65 of the outer surface 63 of the downward tongue 59, of the left floor panel 52a. Said additional bulge 55 co-acts with and snap-fits into a complementary recess 66 applied to an upward flank 67 of the right floor panel 52b. Between the downward tongue 59 and the upward flank 67 an expansion chamber 68 is present in order to be able to compensate play in case of expansion of the floor panels 52, 52b, for example due to moist absorption.

Figure 15:
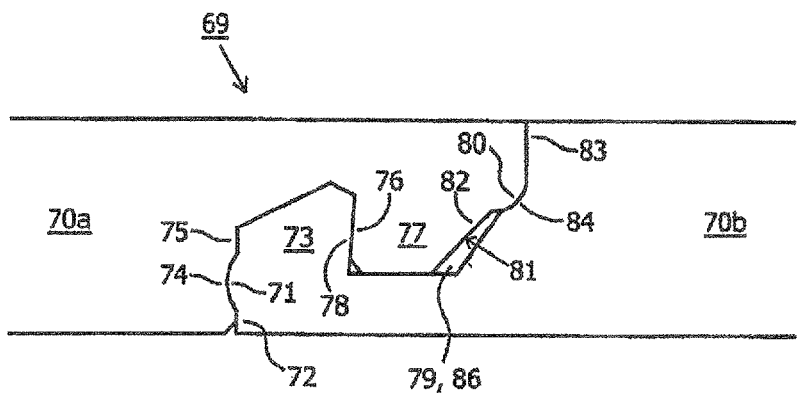
FIG. 15 shows a side view of a part of an assembly of yet another embodiment of connected floor panels according to the invention.

FIG. 15 shows a side view of a part of an assembly 69 of another embodiment of floor panels 70a, 70b according to the invention having three locking mechanisms. A first locking mechanism is based upon the cooperation between an outward bulge 71 positioned at an outward surface 72 of an upward tongue 73 of the right floor panel 70b, and a recess 74 positioned at a downward flank 75 of the left floor panel 70a. A second locking mechanism is formed by the engagement of an inclined surface 76 of the downward tongue 77 of the left floor panel 70a, to an inclined surface 78 of the upward tongue 73 which results in locking the downward tongue 78 of the left floor panel 70a into an upward groove 79 of the right floor panel 70b. A third locking mechanism is formed by the application of an additional outward bulge 80 positioned at an outer surface 81 of the downward tongue 77, and which is more in particular positioned between an aligning edge 82 and a vertical top end 83 of the outer surface 81 of the downward tongue 77, of the left floor panel 70a, wherein there is a smooth transition between the bulge 80 and the vertical top end 83. Said additional bulge 80 co-acts with and snap-fits into a complementary recess 84 applied to an upward flank 85 of the right floor panel 70b. Between the downward tongue 77 and the upward flank 85 an expansion chamber 86 is present in order to be able to compensate play in case of expansion of the floor panels 70, 70b, for example due to moist absorption.

Figure 16:
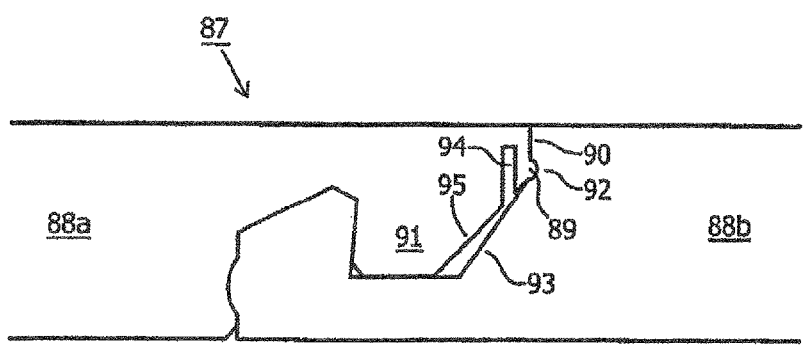
FIG. 16 shows a side view of a part of an assembly of still another embodiment of connected floor panels according to the invention.

FIG. 16 shows a side view of a part of an assembly 87 of another embodiment of floor panels 88a, 88b according to the invention having three locking mechanisms. The first and second locking mechanisms are identical to the first and second locking mechanism as shown in FIG. 6, FIG. 14, and FIG. 15. The third locking mechanism is based upon the application of an outward bulge 89 positioned at an outward surface 90 of a downward tongue 91 of the left floor panel 88a which co-acts with a complementary recess 92 of an upward flank 93 of a right floor panel 88b. The bulge 89 is adapted to deform slightly with respect to a core part of the downward tongue 91 due to the presence of a substantially vertical slot 94, adjacent to the bulge 89, applied into an aligning edge 95 of the downward tongue 91. This flexibility facilitates snapping of the bulge 89 into the recess 92, and hence realization of the connection between the floor panels 88a, 88b.

Figure 17:
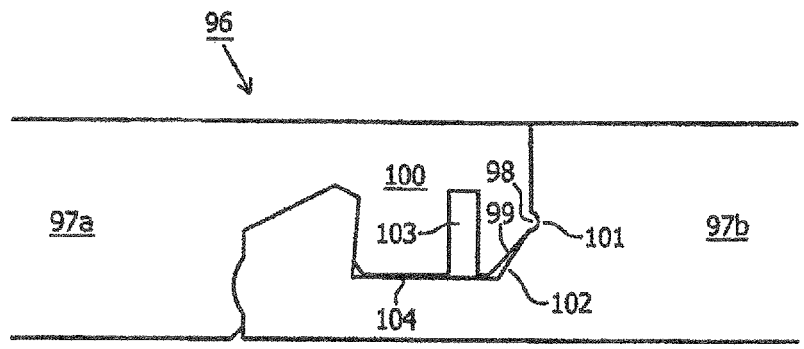
FIG. 17 shows a side view of a part of an assembly of a further embodiment of connected floor panels according to the invention.

FIG. 17 shows a side view of a part of an assembly 96 of another embodiment of floor panels 97a, 97b according to the invention having three locking mechanisms. The first and second locking mechanisms are identical to the first and second locking mechanism as shown in FIG. 6, FIG. 14, FIG. 15, and FIG. 16. Again, the third locking mechanism is based upon the application of an outward bulge 98 positioned at an outward surface 99 of a downward tongue 100 of the left floor panel a which co-acts with a complementary recess 101 of an upward flank 102 of a right floor panel 97b. The bulge 98 is adapted to deform slightly with respect to a core part of the downward tongue 100 due to the presence of a substantially vertical slot 103 applied into a horizontal bottom surface 104 of the downward tongue 100. This flexibility facilitates snapping of the bulge 98 into the recess 101, and hence realisation of the connection between the floor panels 97a, 97b.

Figure 18:
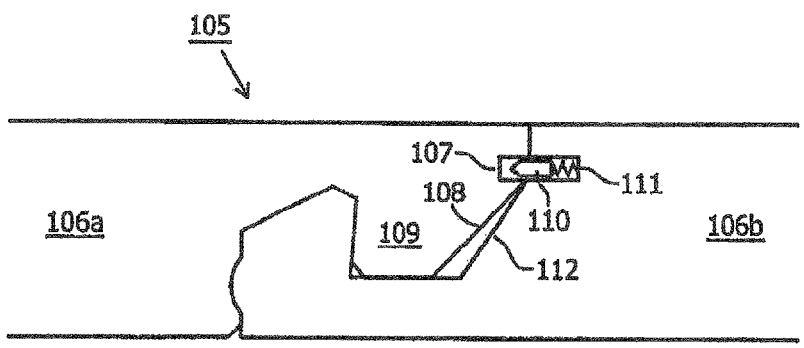
FIG. 18 shows a side view of a part of an assembly of another embodiment of connected floor panels according to the invention.

FIG. 18 shows a side view of a part of an assembly 105 of another embodiment of floor panels 106a, 106b according to the invention having three locking mechanisms. The first and second locking mechanisms are identical to the first and second locking mechanism as shown in the previous figures. The third locking mechanism is based upon the application of a slot 107 positioned at an outward surface 108 of a downward tongue 109 of the left floor panel 106a which co-acts with a horizontally displaceable spring pin 110 contained by an opposite recess 111 of an upward flank 112 of the right floor panel 106b. An outer end of the spring pin 110 is conically shaped as to facilitate connection of both floor panels 106a, 106b.

Figure 19:
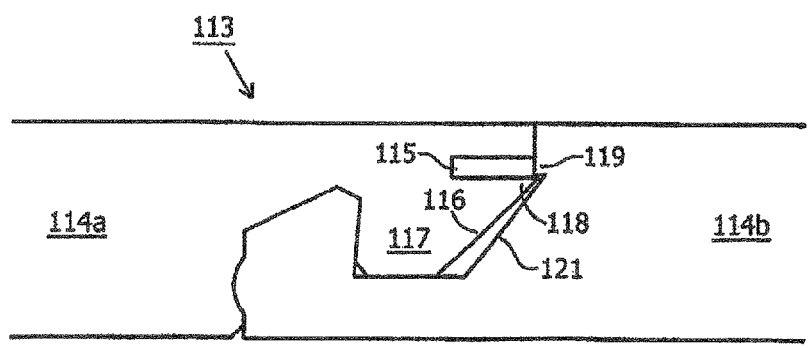
FIG. 19 shows a side view of a part of an assembly of another embodiment of connected floor panels according to the invention.

FIG. 19 shows a side view of a part of an assembly 113 of another embodiment of floor panels 114a, 114b according to the invention having three locking mechanisms. The first and second locking mechanisms are identical to the first and second locking mechanism as shown in the previous figures. The third locking mechanism is based upon the application of a horizontal slot 115 positioned at an outward surface 116 of a downward tongue 117 of the left floor panel 114a, wherein said slot 115 is bounded by a protruding locking edge 118 which co-acts with a complementary counter edge 119 making part of an upward flank 120 of the right floor panel 114b.

Figure 20:
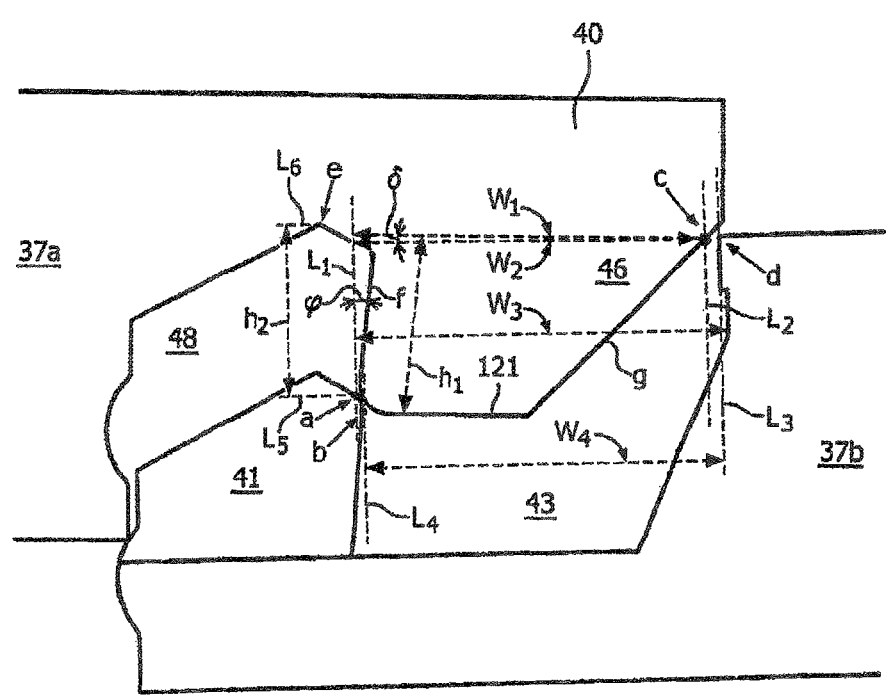
FIG. 20 shows a detailed mathematical view of an intermediate state (pre-alignment state) of the orientation of two floor panels as shown in FIG. 7c.

FIG. 20 shows a detail of the floor panels 37a, 37b as according to FIG. 7c which is considered as an intermediate state in which pre-alignment of the floor panels 37a-37b takes place. The references in this FIG. 18 are defined as follows:

a: contact point between floor panel 37a and floor panel 37b, wherein the floor panels 37a and 37b are undeformed;

b: contact point between floor panel 37a and floor panel 37b, wherein the upward tongue 41 is deformed to allow downward tongue 46 to enter into upward groove 43;

c: a point on the inclining side g of floor panel 37a, which coincides with the plane of the upper surface of the floor panel 37b;

d: the upper corner d of the floor panel 37b;

e: the highest point in the roof of the downward groove 48 f: the inclined flank of the downward tongue 46 in a direction to the downward groove 48;

g: the inclined side of the downward tongue 46 facing away from the downward groove 48;

w1: the actual width w1 of the downward tongue 46 is defined by the distance between a line 11 through the point a of floor panel 37b in a direction perpendicular to the top surface of floor panel 37b and a line 12 through the point c of floor panel 37a in a direction perpendicular to the top surface of floor panel 37b in a direction parallel to the angled outer end 120 of the downward tongue 46;

w2: the effective width w2 of the downward tongue 46 is defined by the shortest distance between the line 11 and the line 12 in a direction parallel to the top surface of floor panel 37b;

w3: the width w3 of the upward groove 43 is defined by the shortest distance between the line 11 and a line 13 through the corner d of floor panel 37b in a direction perpendicular to the top surface of floor panel 37b;

w4: the width w4 of the downward tongue 46 is defined by the shortest distance between a line 14 through the point b of floor panel 37b in a direction perpendicular to the top surface of floor panel 37b and the line 13 h1: the actual height of the downward tongue 46, as defined by the shortest between the angled outer end 120 of the downward tongue 46 and a line through point c parallel to the angled outer end 120 of the downward tongue 46;

h2: the effective height of the downward groove 48, as defined by the shortest distance between a line 15 through point a of floor panel 37b in a direction parallel to the top surface of the floor panel 37b and a line 16 through point e in the roof of the downward groove 48 in a direction parallel to line 15;

δ: the angle between the line through point c of floor panel 37a in a direction parallel to the angled outer end 121 of the downward tongue 46 and a line through point c of floor panel 37a in a direction parallel to the top surface of the floor panel 37b; and φ: the angle between the line 11 and a flank f of floor panel 37a.

The floor panels 37a, 37b as shown in this mutual orientation are undeformed. Between the upper corner d of the floor panel 37b and the point c of the floor panel 37a is a small space so as not to damage or the corner d by a force generated onto floor panel 37a. Floor panels 37a and 37b can be coupled as explained in FIG. 7. During coupling the second coupling part 40 will deform. The contact point between the floor panels 37a and 37b will then move from point a to point b, wherein the downward tongue 46 will be able to be inserted into upward groove 43 of the floor panel 37b.

To allow effective coupling of the floor panels 37a and 37b the mutual relation between the floor panels 37a, 37b are dimensions as follows:

$$w2 < w3$$

$$w2 \leq w4$$

$$w3 > w4$$

$$w2 \approx w1 * \cos \delta$$

$$h1 \approx h2 * \cos \phi$$

$$\delta < \phi$$

$$w1 < w3 * \cos \delta$$

It will be apparent that the invention is not limited to the exemplary embodiments shown and described here, but that within the scope of the appended claims numerous variants are possible which will be self-evident to the skilled person in this field.

The invention claimed is:

1. A laminated floor panel, comprising:

a centrally located core provided with an upper side and a lower side, at least one first resilient coupling part and second resilient coupling part connected respectively to opposite short edges of the core, which first coupling part comprises a single upward tongue, at least one upward flank lying at a distance from the upward tongue and a single upward groove formed between the upward tongue and the upward flank, wherein:

at least a part of a side of the upward tongue facing toward the upward flank extends in the direction of the normal of the upper side of the core, wherein the angle enclosed by on the one hand the direction in which at least a part of a side of the upward tongue facing toward the upward flank extends and on the other the normal of the upper side of the core is between 0 and 45 degrees, at least a part of a side of the upward tongue facing toward the upward flank forms an upward aligning edge for the purpose of coupling the first coupling part to a second coupling part of an adjacent floor panel, and at least a part of a side of the upward tongue facing away from the upward flank is provided with a first locking element which is connected substantially rigidly to the upward tongue and adapted for co-action with a second locking element of a second coupling part of an adjacent floor panel, which second coupling part comprises a single downward tongue, at least one downward flank lying at a distance from the downward tongue, and a single downward groove formed between the downward tongue and the downward flank, wherein:
at least a part of a side of the downward tongue facing toward the downward flank extends in the direction of the normal of the lower side of the core, wherein the angle enclosed by on the one hand the direction in which at least a part of a side of the downward tongue facing toward the downward flank extends and on the other the normal of the lower side of the core is between 0 and 45 degrees,
at least a part of a side of the downward tongue facing away from the downward flank forms a downward aligning edge for the purpose of coupling the second coupling part to a first coupling part of an adjacent floor panel, and
the downward flank is provided with a second locking element which is connected substantially rigidly to the downward flank and adapted for co-action with a first locking element of a first coupling part of an adjacent floor panel,
wherein the upward groove is adapted to receive at least a part of a downward tongue of an adjacent panel, and wherein the downward groove is adapted to receive at least a part of an upward tongue of an adjacent panel.

2. The laminated floor panel as claimed in claim 1, wherein an inclining part of an upper side of the upward tongue connects directly to the upward aligning edge.

3. The laminated floor panel as claimed in claim 1, wherein the aligning edges are chamfered, facilitating hooking together of two coupling parts by the substantially linear displacement of the coupling parts relative to each other.

4. The laminated floor panel as claimed in claim 3, wherein the chamfered aligning edges are formed by a flat surface so as to allow guiding of another coupling part during the process of coupling.

5. The laminated floor panel as claimed in claim 1, wherein the angle enclosed by on the one hand the direction in which at least a part of a side of the downward tongue facing toward the downward flank extends and on the other the normal of the lower side of the core is between 0 and 10 degrees.

6. The laminated floor panel as claimed in claim 2, wherein the upper side of the upward tongue connected directly to the upward aligning edge has a flat orientation.

7. The laminated floor panel as claimed in claim 1, wherein a lower part of the upward flank is oriented diagonally, while an upper part of the upward flank is substantially vertical and forms a stop surface for the second coupling part.

8. The laminated floor panel as claimed in claim 1, wherein a side of the downward tongue facing away from the downward flank is diagonally oriented, but has a flatter orientation than the complementary side of the upward flank, whereby a gap will be formed in the coupled position.

9. A laminated floor panel, comprising:
a centrally located core provided with an upper side and a lower side,
at least one first resilient coupling part and second resilient coupling part connected respectively to opposite edges of the core,
which first coupling part comprises a single upward tongue, at least one upward flank lying at a distance from the upward tongue and a single upward groove formed between the upward tongue and the upward flank, wherein:
at least a part of a side of the upward tongue facing toward the upward flank extends in the direction of the normal of the upper side of the core,
at least a part of a side of the upward tongue facing toward the upward flank forms an angled upward aligning edge for the purpose of coupling the first coupling part to a second coupling part of an adjacent floor panel, and
at least a part of a side of the upward tongue facing away from the upward flank is provided with a first locking element which is connected substantially rigidly to the upward tongue and adapted for co-action with a second locking element of a second coupling part of an adjacent floor panel, said first locking element being positioned at a distance from an upper side of the upward tongue,
which second coupling part comprises a single downward tongue, at least one downward flank lying at a distance from the downward tongue, and a single downward groove formed between the downward tongue and the downward flank, wherein:
at least a part of a side of the downward tongue facing toward the downward flank extends in the direction of the normal of the lower side of the core,
at least a part of a side of the downward tongue facing away from the downward flank forms a downward aligning edge for the purpose of coupling the second coupling part to a first coupling part of an adjacent floor panel, and
the downward flank is provided with a second locking element which is connected substantially rigidly to the downward flank and adapted for co-action with a first locking element of a first coupling part of an adjacent floor panel,
wherein the upward groove is adapted to receive at least a part of a downward tongue of an adjacent panel, and wherein the downward groove is adapted to receive at least a part of an upward tongue of an adjacent panel, wherein said upper side of the upward tongue runs inclining downward in the direction of the side of the upward tongue facing away from upward flank and wherein an upper side of the downward groove having a likewise inclining orientation upward in the direction of the side of the downward tongue facing towards to downward flank.

10. The laminated floor panel as claimed in claim 9, wherein the inclining part of the upper side of the upward tongue connects directly to the upward aligning edge.

11. The laminated floor panel as claimed in claim 9, wherein the aligning edges are chamfered, facilitating hooking together of two coupling parts by the substantially linear displacement of the coupling parts relative to each other.

12. The laminated floor panel as claimed in claim 11, wherein the chamfered aligning edges are formed by a flat surface so as to allow guiding of another coupling part during the process of coupling.

13. The laminated floor panel as claimed in claim 9, wherein an angle enclosed by on the one hand the direction in which at least a part of a side of the downward tongue facing toward the downward flank extends and on the other the normal of the lower side of the core is between 0 and 45 degrees.

14. The laminated floor panel as claimed in claim 13, wherein the angle enclosed by on the one hand the direction in which at least a part of a side of the downward tongue facing toward the downward flank extends and on the other the normal of the lower side of the core is between 0 and 10 degrees.

15. The laminated floor panel as claimed in claim 9, wherein the upper side of the upward tongue running inclining downwards has a flat orientation.

16. The laminated floor panel as claimed in claim 9, wherein a lower part of the upward flank is oriented diagonally, while an upper part of the upward flank is substantially vertical and forms a stop surface for the second coupling part.

17. The laminated floor panel as claimed in claim 9, wherein a side of the downward tongue facing away from the downward flank is diagonally oriented, but has a flatter orientation than the complementary side of the upward flank, whereby a gap will be formed in the coupled position.

18. A floor panel, comprising:
a centrally located core provided with an upper side and a lower side,
at least one first resilient coupling part and second resilient coupling part connected respectively to opposite edges of the core,
which first coupling part comprises a single upward tongue, which is substantially rigid, at least one upward flank lying at a distance from the upward tongue and a single upward groove formed between the upward tongue and the upward flank, wherein:
at least a part of a side of the upward tongue facing toward the upward flank extends in the direction of the normal of the upper side of the core,
at least a part of a side of the upward tongue facing toward the upward flank forms an upward aligning edge for the purpose of coupling the first coupling part to a second coupling part of an adjacent floor panel, and
at least a part of a side of the upward tongue facing away from the upward flank is provided with a first locking element which is connected substantially rigidly to the upward tongue and adapted for co-action with a second locking element of a second coupling part of an adjacent floor panel,
which second coupling part comprises a single downward tongue, which is substantially rigid, at least one downward flank lying at a distance from the downward tongue, and a single downward groove formed between the downward tongue and the downward flank, wherein:
at least a part of a side of the downward tongue facing toward the downward flank extends in the direction of the normal of the lower side of the core,
at least a part of a side of the downward tongue facing away from the downward flank forms a downward aligning edge for the purpose of coupling the second coupling part to a first coupling part of an adjacent floor panel, and
the downward flank is provided with a second locking element which is connected substantially rigidly to the downward flank and adapted for co-action with a first locking element of a first coupling part of an adjacent floor panel,
wherein the upward groove is adapted to receive at least a part of a downward tongue of an adjacent panel, and wherein the downward groove is adapted to receive at least a part of an upward tongue of an adjacent panel, wherein a substantial part of an upper side of the upward tongue runs inclining downward in the direction of the side of the upward tongue facing away from upward flank and wherein an upper side of the downward groove having a likewise inclining orientation upward in the direction of the side of the downward tongue facing towards to downward flank, and wherein a side of the downward tongue facing away from the downward flank is diagonally oriented, but has a flatter orientation than the complementary side of the upward flank, whereby a gap will be formed in the coupled position.

19. The floor panel as claimed in claim 18, wherein the inclining part of the upper side of the upward tongue connects directly to the upward aligning edge.

20. The floor panel as claimed in claim 18, wherein the aligning edges are chamfered, facilitating hooking together of two coupling parts by the substantially linear displacement of the coupling parts relative to each other.

21. The floor panel as claimed in claim 20, wherein the chamfered aligning edges are formed by a flat surface so as to allow guiding of another coupling part during the process of coupling.

22. The floor panel as claimed in claim 18, wherein an angle enclosed by on the one hand the direction in which at least a part of a side of the downward tongue facing toward the downward flank extends and on the other the normal of the lower side of the core is between 0 and 45 degrees.

23. The floor panel as claimed in claim 22, wherein the angle enclosed by on the one hand the direction in which at least a part of a side of the downward tongue facing toward the downward flank extends and on the other the normal of the lower side of the core is between 0 and 10 degrees.

24. The floor panel as claimed in claim 18, wherein the upper side of the upward tongue running inclining downwards has a flat orientation.

25. The floor panel as claimed in claim 18, wherein a lower part of the upward flank is oriented diagonally, while an upper part of the upward flank is substantially vertical and forms a stop surface for the second coupling part.

26. The floor panel as claimed in claim 18, wherein the floor panel is a laminated floor panel.

* * * * *